US007247013B2

(12) United States Patent
Roland

(10) Patent No.: US 7,247,013 B2
(45) Date of Patent: Jul. 24, 2007

(54) POWDER COMPACTING APPARATUS FOR CONTINUOUS PRESSING OF PHARMACEUTICAL POWDER

(76) Inventor: Edward J. Roland, 110 Woodside Ave., Trenton, NJ (US) 08618

( * ) Notice: Subject to any disclaimer, the term of this patent is extended or adjusted under 35 U.S.C. 154(b) by 256 days.

(21) Appl. No.: 10/968,676

(22) Filed: Oct. 19, 2004

(65) Prior Publication Data

US 2005/0084560 A1 Apr. 21, 2005

Related U.S. Application Data

(60) Provisional application No. 60/512,269, filed on Oct. 20, 2003.

(51) Int. Cl.
*B29C 43/46* (2006.01)
*B30B 11/00* (2006.01)

(52) U.S. Cl. ...................... 425/145; 425/169; 425/363; 425/812; 100/176

(58) Field of Classification Search ................ 425/145, 425/149, 169, 170, 363, 367, 812; 100/176
See application file for complete search history.

(56) References Cited

U.S. PATENT DOCUMENTS

| | | | | | |
|---|---|---|---|---|---|
| 2,932,852 | A | * | 4/1960 | Melville et al. | 425/79 |
| 3,010,148 | A | * | 11/1961 | Dasher | 425/79 |
| 3,017,665 | A | * | 1/1962 | Dasher et al. | 425/79 |
| 3,144,681 | A | * | 8/1964 | Krantz et al. | 425/79 |
| 3,242,530 | A | * | 3/1966 | Hirsch et al. | 425/79 |
| 3,298,060 | A | * | 1/1967 | Michalak | 425/79 |
| 3,730,659 | A | | 5/1973 | Smith et al. | |
| 3,734,659 | A | | 5/1973 | Harris | |
| 3,890,080 | A | | 6/1975 | Cotts | |
| 4,111,626 | A | | 9/1978 | Funakoshi et al. | |
| 4,144,009 | A | * | 3/1979 | Jackson et al. | 425/79 |
| 4,167,377 | A | * | 9/1979 | Oakley | 425/79 |
| 4,231,729 | A | * | 11/1980 | Tundermann et al. | 425/79 |
| 5,066,211 | A | * | 11/1991 | Wunder et al. | 425/367 |
| 5,066,441 | A | | 11/1991 | Gerard | |
| 5,515,740 | A | | 5/1996 | Gamberini | |
| 5,517,871 | A | | 5/1996 | Pento | |
| 5,547,357 | A | * | 8/1996 | Bergendahl | 425/79 |
| 5,596,865 | A | | 1/1997 | Kramer | |
| RE35,506 | E | | 5/1997 | Solazzi et al. | |
| 5,648,610 | A | | 7/1997 | Laine et al. | |
| 5,661,249 | A | | 8/1997 | Rupp et al. | |
| 5,671,262 | A | | 9/1997 | Boyer et al. | |
| 5,678,166 | A | | 10/1997 | Piehler et al. | |
| 5,796,051 | A | | 8/1998 | Chiari et al. | |
| 5,958,467 | A | | 9/1999 | Coble et al. | |
| 5,971,038 | A | | 10/1999 | Fiedler et al. | |
| 5,989,487 | A | | 11/1999 | Yoo et al. | |
| 6,001,304 | A | | 12/1999 | Yoo et al. | |
| 6,079,284 | A | | 6/2000 | Yamamoto et al. | |
| 6,106,262 | A | | 8/2000 | Levin et al. | |

(Continued)

*Primary Examiner*—James P. Mackey
(74) *Attorney, Agent, or Firm*—Sperry, Zoda & Kane

(57) ABSTRACT

Improved powder compacting apparatus for feeding powder between rollers to form a compressed material with enhanced physical properties including uniformity to facilitate forming tablets and similar items therefrom. Side seals confine the powder between the rollers and can be movable independently from the rollers and optionally independently from one another to enhance even compaction. A housing defines a guide channel with a linear feed and shearing zone immediately prior to the nip zone for smoothing and leveling powder flow. One or more vents are provided for releasing gases generated.

45 Claims, 5 Drawing Sheets

U.S. PATENT DOCUMENTS

| | | | |
|---|---|---|---|
| 6,183,690 | B1 | 2/2001 | Yoo et al. |
| 6,187,087 | B1 | 2/2001 | Yoo et al. |
| 6,234,744 | B1 | 5/2001 | Cawley |
| 6,257,079 | B1 | 7/2001 | Mueller |
| 6,260,419 | B1 | 7/2001 | Kramer |
| 6,270,718 | B1 | 8/2001 | Yoo et al. |
| 6,482,338 | B1 | 11/2002 | Levin et al. |

* cited by examiner

POWDER COMPACTING APPARATUS FOR CONTINUOUS PRESSING OF PHARMACEUTICAL POWDER

This application claims priority rights of the U.S. Provisional Patent Application No. 60/512,269 filed Oct. 20, 2003 on "Improved Roller Compaction Apparatus And Process" by the same inventor, Edward J. Roland, now pending.

BACKGROUND OF THE INVENTION

1. Field of the Invention

Pharmaceutical entities use dry granulated material for forming tablets. This powder needs to flow smoothly and uniformly during compaction to facilitate forming of pharmaceutical tablets from the compressed material. Dry granulation is the preferred system since it is an in line process, and is not processed in batches. Instead it is a continuously occurring process which can be monitored. This process provides significantly greater product control. Also such processes minimize gaseous emissions that could otherwise be problematic. Furthermore, there are no solvents which provide various environmental problems. Also, other prior art systems are more complicated, and for this reason, pharmaceutical companies have settled on dry granulate as the preferred material from which tableting is performed. Also, such dry granulate processing is more easily adapted for use when forming products which have some level of moisture sensitivity.

2. Description of the Prior Art

Current prior art systems and apparatus have significant problems with dry granulation and roller compaction systems. In particular, there is very poor control of smoothness of flow, powder leveling and pressure distribution. This inaccurate control often results in uneven compressing or excessive compressing which reduces the recompressability of the product. Also under compressing presents an entirely different set of problems wherein the final product is not granules, but actual dust due to the lack of sufficient compression. Roller compaction produces a product which can be uneven and, therefor, needs to be accurately controlled in order to provide a compressed material which is capable of generating homogeneous tablets regularly.

In the prior art there is no accurate means for allowing full measurement and control of compacting pressure and distribution. The apparatus of the present invention provides this control by utilizing dynamically control side seals which can be moved at speeds different from the speeds of the rollers and, in some applications, different from one another. Also venting enhances the compaction process. Monitoring of compaction parameters further enhances the uniformity of the final compressed material.

As such, it is seen that the current state of the art shows a need for monitoring and feedback of the product in order to monitor the parameters of the process and to control the process, and as a result, the quality of compacted material varies widely and greatly. Many machine designs have been made for the purpose of testing, however, these normally are small quantity test materials, and the results are often not reproducible or predictable when scaled up to a full size machine usable in a production line. In particular, material that may have failed in the roller compaction process may work well where better controls of the compaction process are used for measurement and monitoring and feedback.

Many patents have been designed for the purposes of roller compaction or monitoring roller compaction technology such as shown in U.S. Pat. No. 3,730,659 patented May 1, 1973 to Joseph E. Smith and George D. DeTroyer and assigned to Wolverine-Pentronix, Inc. on a "Powder Dispenser For A Powder Compacting Press"; and U.S. Pat. No. 3,734,659 patented May 22, 1973 to Leroy S. Harris and assigned to K-G Industries Inc. on a "Drive Means For Material Compacting Apparatus"; U.S. Pat. No. 3,890,080 patented Jun. 17, 1975 to Ronald F. Cotts and assigned to IU Conversion Systems, Inc. on a "Roll-Pelletizer For Making Uniform Particle Size Pellets"; and U.S. Pat. No. 4,111,626 patented Sep. 5, 1978 to Yoshiro Funakoshi et al and assigned to Takeda Chemical Industries Ltd. on a "Powder Compacting Machine"; and U.S. Pat. No. 5,066,441 patented Nov. 19, 1991 to Thomas W. Gerard and assigned to Rhone-Poulenc Basic Chemicals Co. on a "Process For Compacting A Calcium Phosphate Composition"; and U.S. Pat. No. 5,515,740 patented May 14, 1996 to Ernesto Gamberini and assigned to MG2 S.p.A. on an "Apparatus For Dosing A Pharmaceutical product Into Capsules"; and U.S. Pat. No. 5,517,871 patented May 21, 1996 to Tapio Pento and assigned to Tensor Oy on a "Procedure For Simulating Tablet Compression"; and U.S. Pat. No. 5,596,865 patented Jan. 28, 1997 to Norbert Kramer on a "Method For The Removal And The Further Processing Of Tablets Or Pills Or The Like Derived From A Tablet Press And A Device For Performing The Method"; and Reissue Pat. Re. 35,506 patented May 13, 1997 to MIchael C. Solazzi et al and assigned to Chemplex Industries Inc. on a "Power Compacting Press Apparatus and Methods"; and U.S. Pat. No. 5,648,610 patented Jul. 15, 1997 to Ensio Laine et al on a "Method And Apparatus For The Characterization And Control Of Powder Compaction"; and U.S. Pat. No. 5,661,249 patented Aug. 26, 1997 to Michael Rupp et al and assigned to Walter Grassle GmbH on an "Apparatus And Method For Inspecting Small Articles"; and U.S. Pat. No. 5,671,262 patented Sep. 23, 1997 to Joseph H. Boyer et al on a "Method For Counting And Dispensing Tablets, Capsules, And Pills"; and U.S. Pat. No. 5,678,166 patented Oct. 14, 1997 to Henry R. Piehler et al and assigned to Henry R. Piehler on a "Hot-Triaxial Compaction"; and U.S. Pat. No. 5,796,051 patented Aug. 18, 1998 to Franco Chiari et al and assigned to Macofar S.p.A. on a "Process For In-Line Capsule Check Weighting And The Apparatus Which Allows The Process To Be Implemented"; and U.S. Pat. No. 5,958,467 patented Sep. 28, 1999 to Herbert Dale Coble et al and assigned to Glaxo Wellcome Inc. on an "Exit Chute For Pharmaceutical Tablet Press Machine"; and U.S. Pat. No. 5,971,038 patented Oct. 26, 1999 to Jurgen Fiedler et al and assigned to KORSCH Pressen GmbH on a "Process And Device For Checking The Tablet Parameters"; and U.S. Pat. No. 5,989,487 patented Nov. 23, 1999 to Sang H. Yoo et al and assigned to Materials Modification, Inc. on an "Apparatus For Bonding A Particle Material To Near Theoretical Density"; and U.S. Pat. No. 6,001,304 patented Dec. 14, 1999 to Sang H. Yoo et al and assigned to Materials Modification, Inc. on a "Method Of Bonding A Particle Material To Near Theoretical Density"; and U.S. Pat. No. 6,079,284 patented Jun. 27, 2000 to Taizo Yamamoto and assigned to Shinogi Qualicaps Co., Ltd. on a "Visual Inspection Apparatus For Tablets"; and U.S. Pat. No. 6,106,262 patented Aug. 22, 2000 to Michael Levin et al and assigned to Metropolitan Computing Corporation on a "Press Simulation Apparatus"; and U.S. Pat. No. 6,183,690 patented Feb. 6, 2001 to Sang H. Yoo et al and assigned to Materials Modification, Inc. on a "Method Of Bonding A Particle Material To Near Theoretical Density"; and U.S. Pat. No. 6,187,087 patented Feb. 13, 2001 to Sang H. Yoo et al and assigned to Materials Modification, Inc. on a "Method Of Bonding A Particle Material To Near Theoretical Density"; and U.S. Pat. No. 6,234,744 patented May 22, 2001 to Don Cawley and assigned to Sage Automation, Inc. on a "Robotic Palletizing System"; and U.S. Pat. No. 6,257,079 patented Jul. 10, 2001 to Werner G. Mueller and assigned to Erweka GmbH on a "Tablet Testing Appliance"; and U.S. Pat. No. 6,260,419 patented Jul. 17, 2001 to Norbert Kramer on a "Method And Device For Conducting A Hardness Test On Test Specimens, Especially Tablets Or Pills"; and U.S. Pat. No. 6,270,718 patented Aug. 7, 2001 to Sang H. Yoo et al and assigned to Materials Modification, Inc. on a "Method Of Bonding A Particle Material To Near Theoretical Density"; and U.S. Pat. No. 6,482,338 patented Nov. 19, 2002 to Michael Levin et al and assigned to Metropolitan Computing Corporation on a "Press Simulation Apparatus And Methods".

SUMMARY OF THE INVENTION

The present invention provides a powder compacting apparatus which continuously presses pharmaceutical powder into a compressed material or substrate with optional feedback control to maintain uniformity of the compressed substrate. A main housing is provided which is adapted to receive powder for compacting thereof. The housing includes a powder inlet opening for receiving powder therethrough. The housing also includes a powder flow leveling channel in fluid flow communication with respect to the powder inlet opening for receiving powder therefrom. The powder flow leveling channel can be tapered along at least a partial section therealong to facilitate compacting of powder passing therethrough. The powder flow leveling channel includes an enhanced friction surface therealong to further facilitate powder flow leveling.

Also defined in the main housing is a powder introduction channel in flow communication with respect to the powder inlet opening for receiving powder therefrom and in fluid flow communication with respect to the powder flow leveling channel for supplying of powder thereto. The powder introduction channel is adapted to guide the movement of powder from the powder inlet opening to the powder flow leveling channel. A nip zone or nip point is defined downstream of the flow leveling zone within the compaction zone immediately upstream from the rollers. The nip zone is the point where there is no further sliding of the powders against the roller surfaces. Here sufficient grip has been achieved to cause the powders to move at the same velocity as the velocity of the circumferential surfaces of the rollers. A first vent is also defined extending from the powder flow leveling channel to the ambient external environment to facilitate release of gases generated. A second vent is also included extending from the powder flow leveling channel to the ambient external environment to facilitate release of gases generated. A porous filter is preferably included located within the first vent to prevent powder from exiting the main housing while allowing gases to exit therefrom.

A primary roller is included rotatably mounted adjacent to the main housing such as to be rotatably driven. The primary roller includes a primary circumferential compacting surface extending circumferentially therearound to facilitate compacting of powder moved thereadjacent within the compaction zone. The primary roller includes an inner primary roller side and an outer primary roller side oppositely disposed from one another. The powder flow leveling channel and the primary circumferential compacting surface of the primary roller are adapted to exert shearing forces upon powder moving through the powder flow leveling channel.

Similarly a secondary roller is rotatably mounted adjacent the main housing at a position immediately adjacent to the primary roller such as to define a roller compacting zone therebetween. This zone is in flow communication with respect to the main housing to receive powder therefrom for compacting thereof between the primary roller and the secondary roller. The secondary roller also includes a secondary circumferential compacting surface extending circumferentially therearound to facilitate the compacting of powder moved thereadjacent. This secondary roller is also rotatably driven along with the primary roller such that the primary circumferential compacting surface and the secondary circumferential compacting surface move together simultaneously in the same direction adjacent to the roller compaction zone to facilitate movement of powder therethrough for compacting into a compressed substrate. The secondary roller includes an inner secondary roller side and an outer secondary roller side oppositely disposed therefrom. The secondary roller is rotatably mounted with respect to the main housing and defines the roller compaction zone between the secondary circumferential compacting surface thereof and the primary circumferential compacting surface of the primary roller. In this manner the roller compacting zone is in flow communication with respect to the powder flow leveling channel to receive powder therefrom.

The nip zone is defined within roller compaction zone wherein the first roller and the second roller initiate compacting of powder passing theretoward. The housing and the secondary roller define therebetween the second vent extending from the powder flow leveling channel and the roller compaction zone to the external ambient environment to facilitate release of gases generated therein. The secondary roller is adapted to rotate with respect to the main housing in a direction toward the roller compaction zone in order to minimize exiting of powder outwardly from the main housing through the second vent while facilitating the exiting of gases therethrough.

Furthermore the present invention can optionally include a first dynamic side seal positioned extending outwardly from adjacent the inner primary roller side of the primary roller adjacent to the roller compacting zone to facilitate defining thereof. The first dynamic side seal extends further outwardly to a position adjacent to the inner secondary roller side of the secondary roller to facilitate defining of the roller compaction zone thereadjacent and to prevent movement of powder outwardly laterally from the roller compacting zone pass the inner primary roller size and the inner secondary roller side during compressing of powder moving through the roller compaction zone. The first dynamic side seal is driven independently to be selectively capable of rotational speed different from the rotational speed of the primary roller and of the secondary roller. The first dynamic side seal includes a first dynamic annular ring defining the roller compaction zone thereadjacent. The primary roller and the first dynamic side seal and the second dynamic side seal are each rotatably mounted independently from one another preferably with respect to the main housing and are positioned with the primary circumferential compacting surface located adjacent to the powder flow leveling channel to facilitate compacting of powder passing therethrough. The first dynamic side seal extends perpendicularly preferably with respect to the primary circumferential compacting surface and a second circumferential compacting surface to facilitate defining of said roller compaction zone therebetween.

A second dynamic side seal can be, optionally, included which is positioned extending outwardly from adjacent the outer primary roller seal of the primary roller adjacent to the roller compacting zone to facilitate defining of this zone. This second dynamic side seal extends further outwardly to a position adjacent the outer secondary roller side of the secondary roller to facilitate defining of the roller compaction zone thereadjacent and to prevent movement of powder outwardly laterally from the roller compacting zone past the outer primary roller side and the outer secondary roller side during compressing of the powder as it moves through the roller compaction zone.

The second dynamic side seal is driven independently to be selectively capable of rotational speed different from the rotational speed of the primary roller and of the secondary roller and of the first dynamic side seal in a preferred embodiment. The first dynamic annular ring defines the roller compaction zone and at least partially extends over the inner primary roller side and at least partially extends over the inner secondary roller side for retaining powder within the roller compaction zone during compacting thereof. The second dynamic side seal includes a second dynamic annular ring defining the roller compaction zone thereadjacent and at least partially extending over the outer primary roller side and at least partially extending over the outer secondary roller side for retaining powder within the roller compacting zone during compacting. The first dynamic side seal and the second dynamic side seal are spatially disposed and parallel with respect to one another preferably and extend preferably perpendicularly with respect to the primary circumferential compacting surface and the secondary circumferential compacting surface to facilitate defining of the roller compaction zone therebetween.

The present invention may further include a sensing means mounted within the powder flow leveling channel of the main housing for monitoring the condition of the powder therewithin by preferably monitoring the pressure of compaction. This sensing means is preferably positioned within the housing between the powder inlet opening and the nip zone to enhance monitoring of the powder flow leveling. A sensing means is also positioned within the powder flow leveling channel at a location immediately adjacent to the nip zone to facilitate monitoring thereof and possibly monitoring the pressures thereof during compacting of powder moving toward the roller compaction zone. The sensing means includes a first sensing section positioned adjacent to the first dynamic side seal for monitoring of powder passing thereadjacent. Also preferably included is a second sensing section positioned adjacent to the second dynamic side seal for monitoring of powder passing thereadjacent. Finally a central sensing section is also preferably included positioned spaced approximately equally between the first dynamic side seal and the second dynamic side seal for monitoring of powder passing centrally through the roller compaction zone. The speed of rotation of the first dynamic side seal is preferably operative to increase responsive to the first sensing section sensing less pressure during compacting of powder than sensed by the central sensing section. The speed of rotation of the second dynamic side seal is operative to increase responsive to the second sensing section sensing less pressure during compaction of powder than sensed by the central sensing section. The speed of rotation of the first dynamic side seal means is operative to decrease responsive to the first sensing section sensing more pressure during compacting of powder than sensed by the central sensing section. The speed of rotation of the second dynamic side seal is operative to decrease responsive to the second sensing section sensing more pressure during compacting of powder than sensed by the central sensing section.

Drive of the apparatus of the present invention preferably includes a roller drive for oppositely driving the primary and secondary rollers as well as a first dynamic side seal drive operative for driving the first dynamic side seal and a second dynamic side seal drive for operatively driving the second dynamic side seal independently.

It is an object of the roller compacting apparatus for continuously pressing of pharmaceutical powder into a compressed substrate utilizing feedback control of the present invention using independently controlled dynamic side seals for more efficient material compaction.

It is an object of the roller compacting apparatus for continuously pressing of pharmaceutical powder into a compressed substrate utilizing feedback control to provide independently controlled dynamic side seals for more even and smooth compaction of powdered material.

It is an object of the roller compacting apparatus for continuously pressing of pharmaceutical powder into a compressed substrate utilizing feedback control which provides independently movable side seals for enhancing smoothness and evenness of powder compaction.

It is an object of the roller compacting apparatus for continuously pressing of pharmaceutical powder into a compressed substrate utilizing feedback control which can easily be configured to include an accurate shear and linear feed zone.

It is an object of the roller compacting apparatus for continuously pressing of pharmaceutical powder into a compressed substrate utilizing feedback control which utilizes a plurality of monitors for sensing parameters of material compaction.

It is an object of the roller compacting apparatus for continuously pressing of pharmaceutical powder into a compressed substrate utilizing feedback control which produces normally consolidated powder prior to the nip from the typical mix of over or under consolidated powder traveling toward the nip zone.

It is an object of the roller compacting apparatus for continuously pressing of pharmaceutical powder into a compressed substrate utilizing feedback control which provides for complete ventilation of gases in the powder to facilitate compaction thereof.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
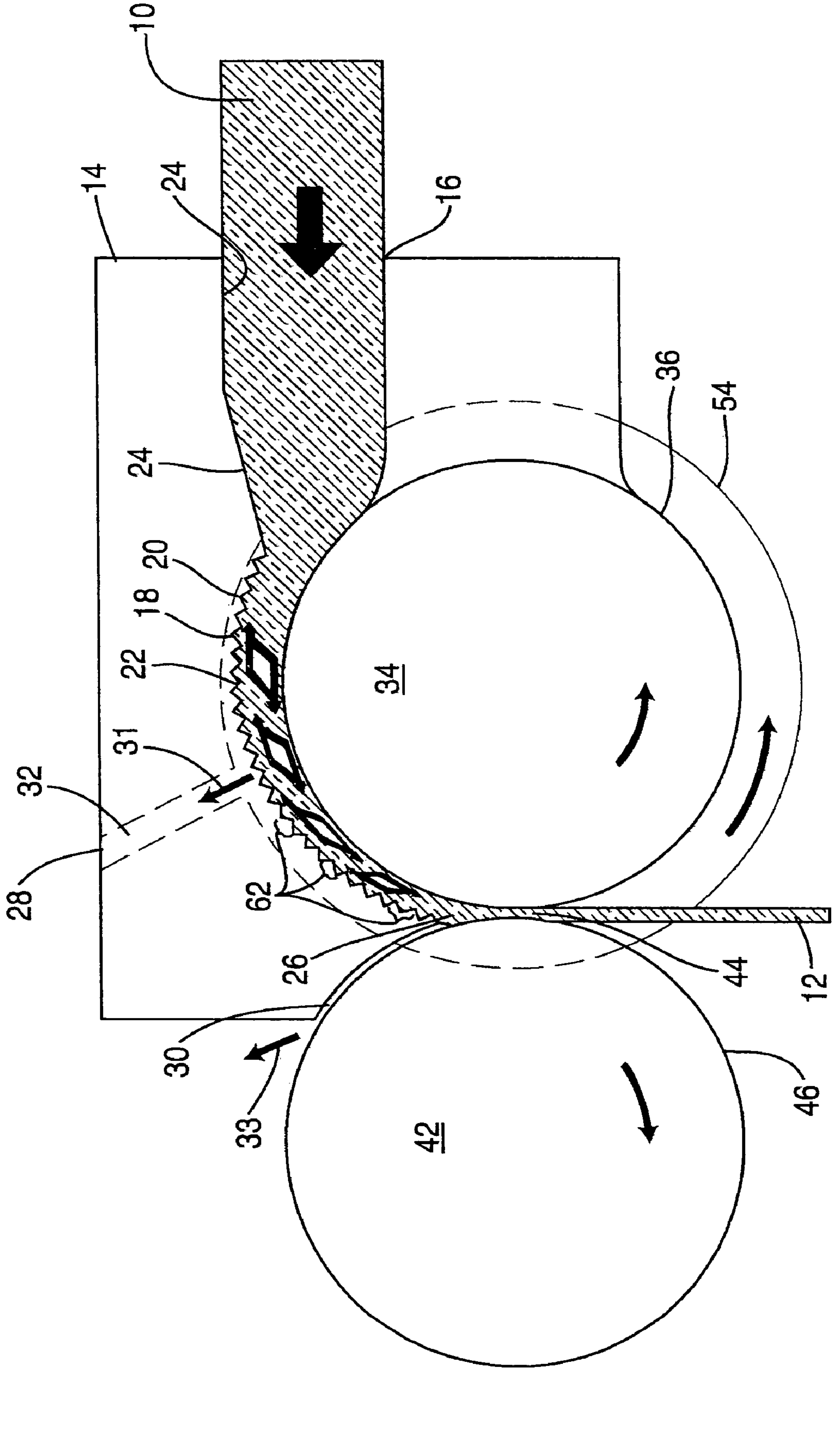
FIG. 1 is a side cross-sectional view of an embodiment of the powder compacting apparatus of the present invention.
Figure 2:
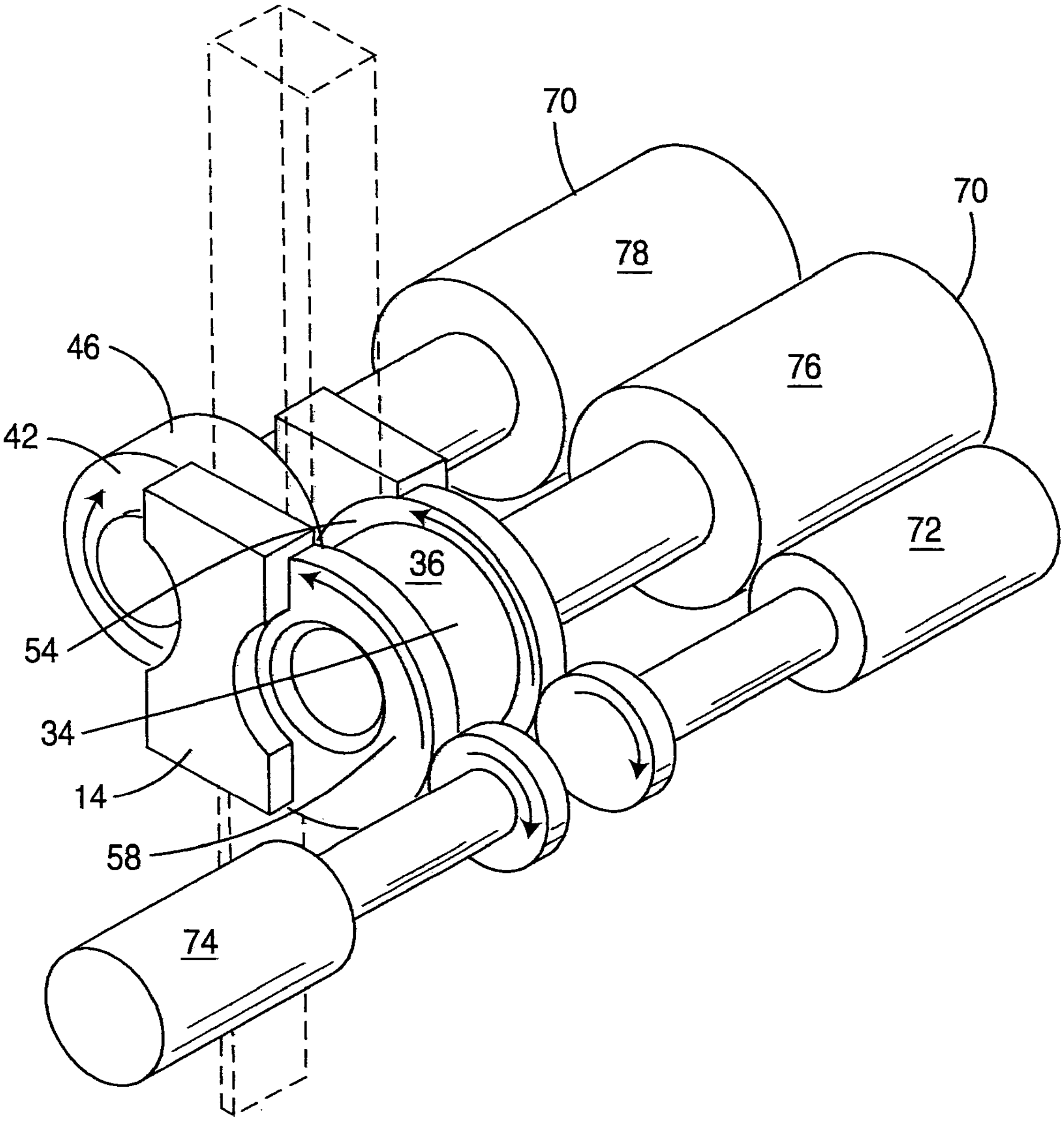
FIG. 2 is a perspective view of a further embodiment of the powder compacting apparatus of the present invention.
Figure 3:
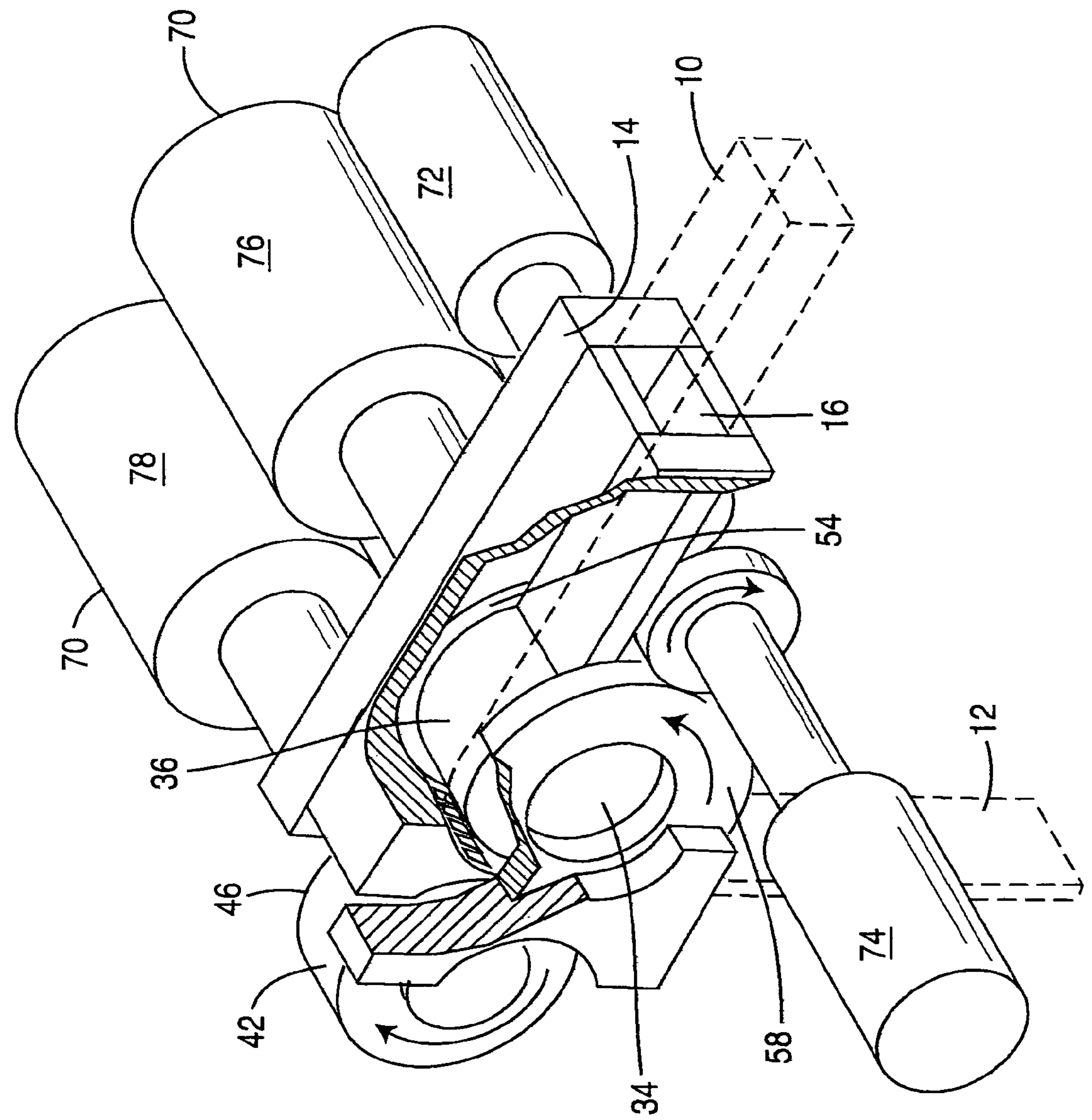
FIG. 3 is a perspective illustration of an alternative embodiment of the powder compacting apparatus of the present invention.
Figure 4:
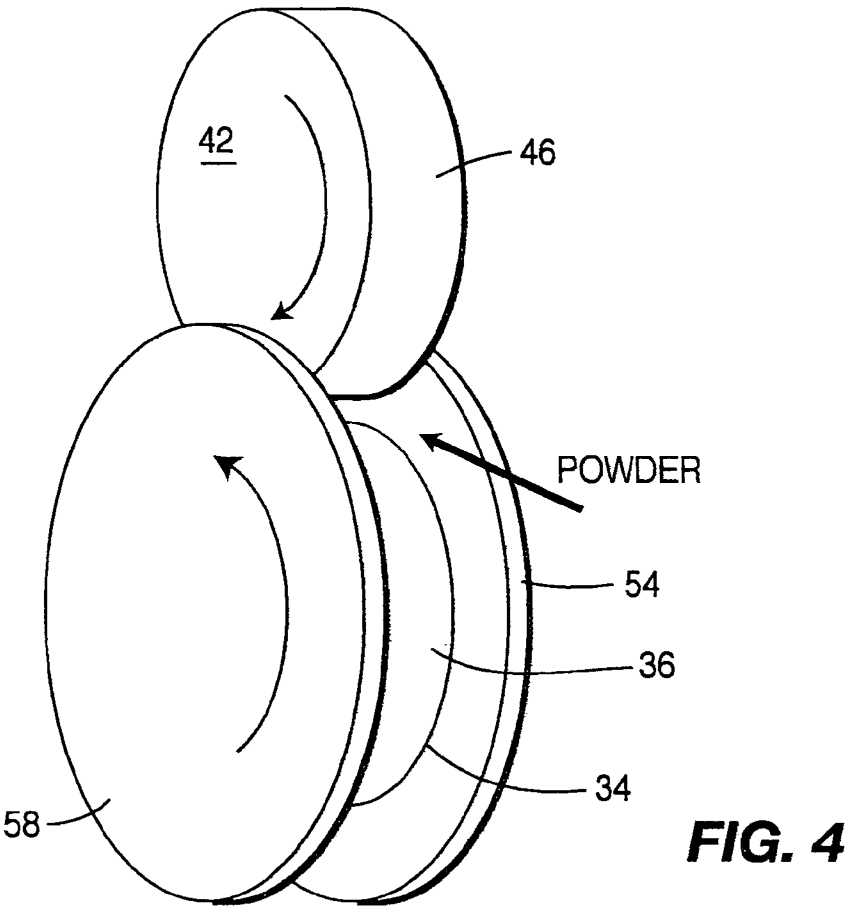
FIG. 4 is a perspective illustration of the primary and secondary roller shown engaged between two embodiments of the dynamic side seals of the present invention.
Figure 5:
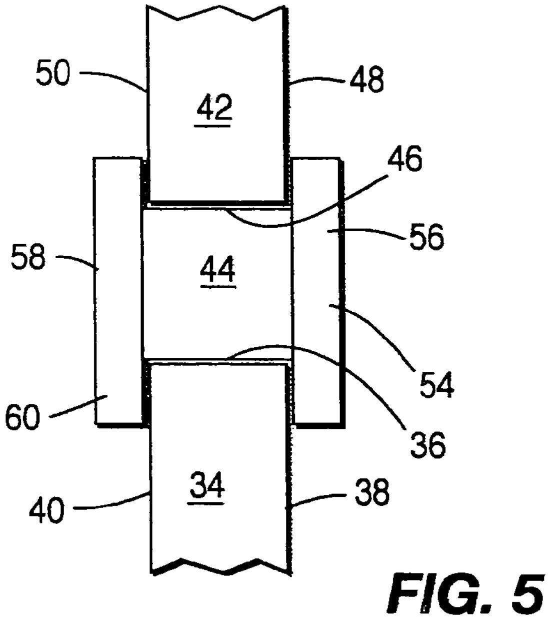
FIG. 5 is a cross-sectional view of FIG. 4.

The apparatus of the present invention is designed for the purpose of receiving powder 10 such as pharmaceutical powder and compressing it into a compressed substrate 12 of material from which pharmaceutical tablets can easily be formed.

The apparatus includes a main housing 14 which defines a powder inlet opening 16 for receiving powder passing thereinto. A powder introduction channel 24 can optionally be included for transferring or carrying of uncompressed powder from inlet opening 16 to a powder flow leveling channel 18. The powder flow leveling channel 18 can optionally include a tapered section 20 along. Also the main housing 14 will defined an enhanced friction surface 22 within the powder flow leveling channel 18 as shown best in FIG. 1. This irregular surface along the upper portion of the powder flow leveling channel 18 defined at the powder introduction channel 24 is shown in an exaggerated manner in FIG. 1. Also, a nip zone 26 is defined within the roller compacting zone 44 adjacent to the primary roller 34 and the secondary roller 42.

Primary roller 34 is rotatably mounted adjacent and preferably within the housing 14 and secondary roller 42 is rotatably movable with respect to the housing also. These two rollers define therebetween a roller compacting zone 44 in which the final compression of the powder 10 is performed in order to form the compressed substrate 12. The roller compacting zone 44 is in flow communication with respect to the powder flow leveling channel 18. The powder flow leveling channel 18 is in flow communication with respect to the powder inlet opening 16 for receiving powder flow. The powder introduction channel 24 is only an option within the present invention in order to facilitate the movement of powder 10 from the powder inlet opening 16 to the powder flow leveling channel 18 if needed. As such, the flow of powder 10 initially goes through the powder inlet opening 16 into the powder introduction channel 24 if provided and then into the powder flow leveling channel 18. This powder will be conditioned by shear straining of the powder mass and by leveling and smoothing during movement through the powder flow leveling channel 18 as it moves toward the nip zone 26. Nip zone 26 is defined as the point at which the movement of the rollers 34 and 42 will initiate further compacting and drawing of the powder into the roller compacting zone 44 defined therebetween. Normally the nip zone 26 is defined to be approximately eight degrees upstream from the point of top dead center located between the respective radii of the rollers 34 and 42.

To further facilitate compacting the primary roller 34 will preferably include a primary circumferential compacting surface 36 about the outer periphery thereof and the secondary roller 42 will include a secondary circumferential compacting surface 46 located peripherally therearound. The circumferential compacting surfaces 36 and 46 will facilitate the drawing of pharmaceutical powder 10 into and through the roller compacting zone 44. These surfaces are preferably somewhat roughened to facilitate this action. The primary roller 34 will include an inner primary roller side 38 and an outer primary roller side 40 oppositely positioned thereon. Similarly the secondary roller means 42 will include an inner secondary roller side 48 and an oppositely located outer secondary roller side 50.

Most prior art devices utilize stationary side seals to prevent the pharmaceutical powder 10 from exiting laterally outwardly from the roller compacting zone 44. The present invention provides a unique configuration for these side seals in that they are dynamically and independently movable. In particular the present invention includes a first dynamic side seal means 54 which is positioned adjacent to the roller compacting zone 44 and extends at least partially over the inner primary roller side 38 and at least partially over the inner secondary roller side 48 to facilitate sealing of one side of the roller compacting zone 44. Similarly the second dynamic side seal means 58 will be positioned on the opposite side from the first dynamic side seal 54 preferably such that it extends at least partially across the outer primary roller side 40 and the outer secondary roller side 50 in such a manner as to seal the opposite side of the roller compacting zone 44. The first and second dynamic side seals 54 and 58 can comprise disks or rings. See the first dynamic annular ring 56 and the second dynamic annular ring 60 as shown in the drawings herewithin.

One of the important characteristics of the present invention is in the movement capability of the dynamic side seals. These seals are defined to be movable at speeds different from the speed of driving of the rollers 34 and 42. The speeds of driving of the two dynamic side seals 54 and 58 are also defined to be capable of varying relative to the speed of driving of the rollers 34 and 42. As such, it is preferable that both the first dynamic side seal 54 and the second dynamic side seal 58 be independently movable and independently variable in speed relative to the rollers. It is further preferable that the first and second dynamic side seals 54 and 58 be independently movable relative to one another to further vary the speed of operation thereof and in this manner facilitate more accurate and complete control of compacting of powder within the roller compacting zone 44. To facilitate this control it is also preferable that independent drive mechanisms are provided for each of the above-described parts. See the roller drive 70 capable of driving of the primary and secondary roller drives or alternatively see the primary roller drive 76 and the secondary roller drive 78 capable of driving the rollers themselves at independent speeds relative to one another and relative to the dynamic side seals. Finally, also see the first dynamic side seal drive 72 and the second dynamic side seal drive 74 which provide independent capability movement of the side seals from any driving mechanism for the roller and also which provide the capability of independent driving of the first and second dynamic side seal members 54 and 58 relative to one another.

Figure 6:
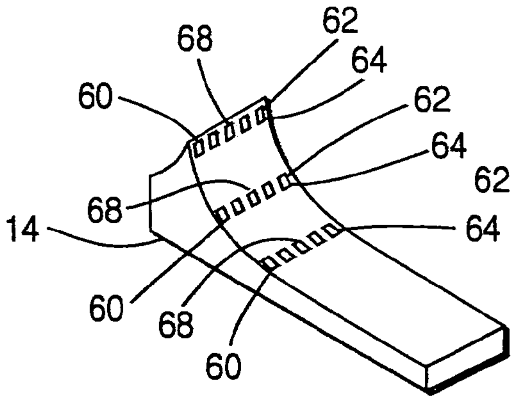
FIG. 6 is a broken view showing an embodiment of the arrays of sensing means of the present invention shown mounted in the main housing.
Figure 7:
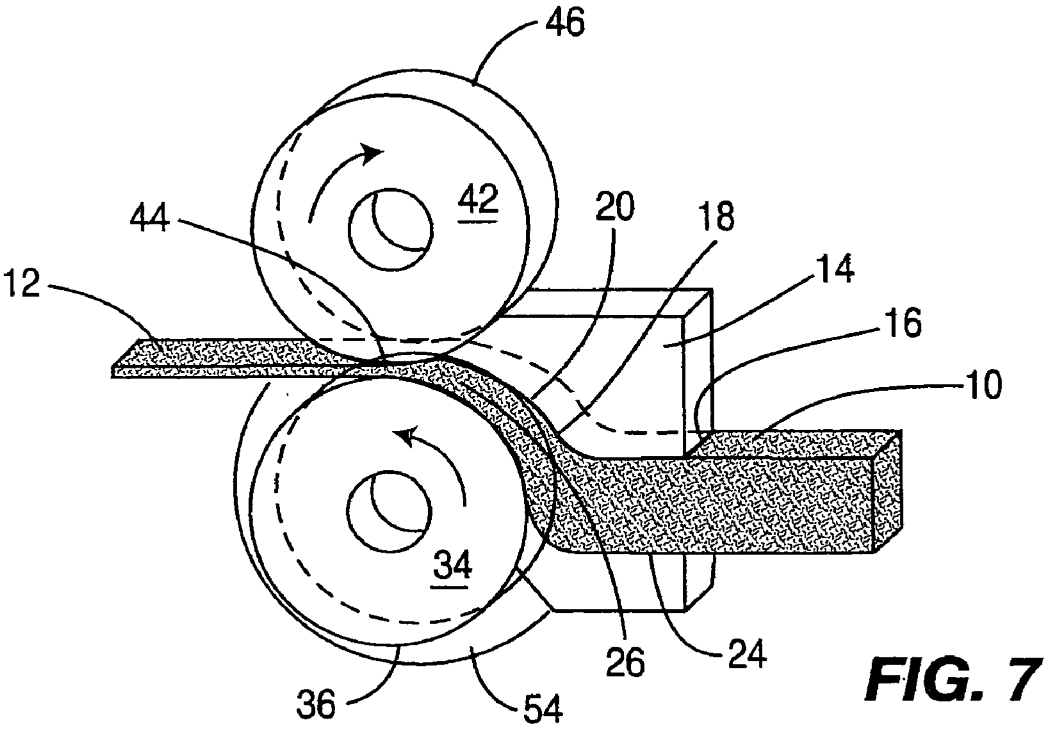
FIG. 7 is another alternative embodiment of the present invention showing powder fed from the right horizontally and exiting horizontally toward the left.
Figure 8:
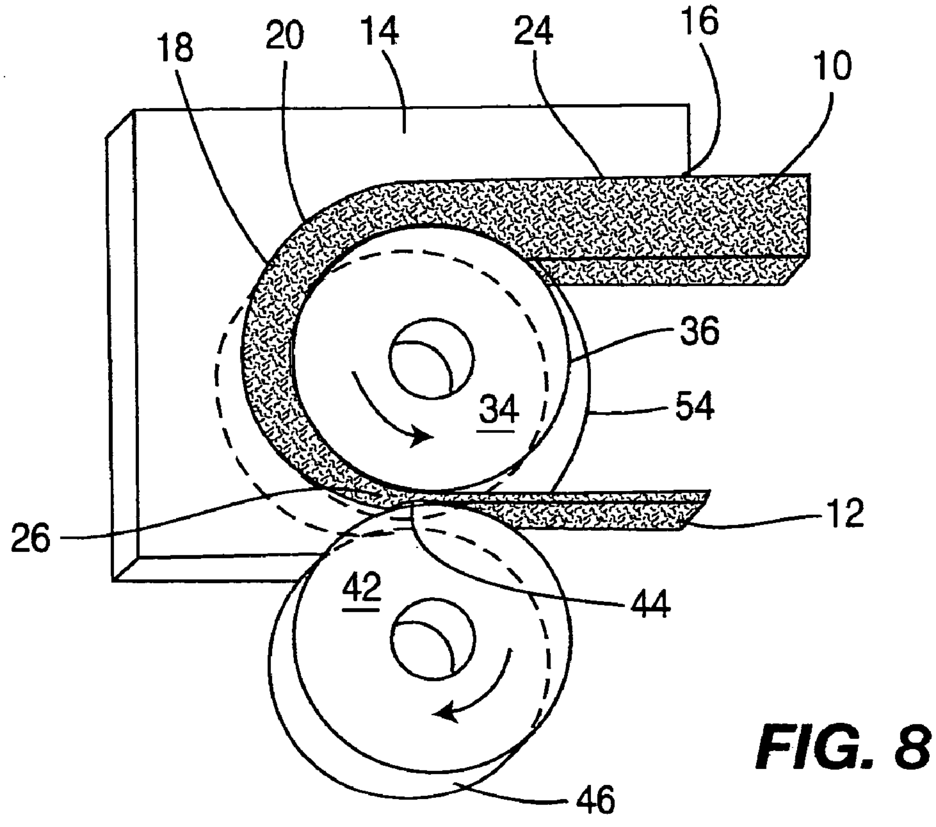
FIG. 8 is another alternative embodiment showing powder in-fed from the right horizontally and exiting horizontally to the right displaced beneath the infeed.

Control of compacting with the apparatus of the present invention is significantly enhanced by a feedback system comprised primarily of a sensing means 62. The sensing means 62 preferably comprises a plurality of arrays of sensors designed for the purpose of monitoring the condition of the powder on an ongoing continuous basis. This sensing means can monitor various parameters including pressure of compacting, density of the compacted material or other parameters which indicate some aspect of the level of smoothing, leveling and/or compacting. The sensors could also monitor hardness or any other parameters which provides some indication of the level of compression that the powder 10 has experienced. Preferably the sensing means 62 includes a sensing array at a plurality of individual locations within the powder flow leveling channel 18. The three separate positions for an array of such sensing means 62 are shown in side view in FIG. 1 and are shown in greatest detail in FIG. 6. FIG. 6 shows three sets of sensing means 62 each including five individual sensors extending from one end of the roller compacting zone 44 adjacent the first dynamic side seal 54 to the opposite end immediately adjacent the second dynamic side seal 58. Preferably each array of sensing means 62 will include a first sensing section 64 located generally adjacent to the first dynamic side seal 54 as well as a second sensing section 66 positioned adjacent to the second dynamic side seal 58. Also preferably each array of sensing means 62 will also include a central sensing section 68 positioned centrally within the flow leveling zone. In this way monitoring of the compacting can occur broadly across the entire lateral dimension of the powder flow leveling channel 18 while also monitoring the condition of the powder 10 traveling toward the roller compacting zone 44. Also the use of multiple arrays of sensing means 62, as shown in FIG. 6 and as such in FIG. 1, will provide information on the degree of compacting of the pharmaceutical powder 10 as it passes through the powder flow leveling channel 18 toward the nip zone 26. It is preferable that the sensing means 62 of the present invention be located as close to the nip zone 26 as possible without being downstream thereof. It is also preferable that multiple arrays of such sensing means 62 be located upstream from the nip zone as shown best in FIGS. 1 and 6 to enhance monitoring of the progression of compacting ongoing on a continuous basis.

Compacting of pharmaceutical powder 10 yields gases as a by-product which needs to be released from the area of compacting. The present invention provides two vents for providing this gas release. A first vent 28, as shown best in FIG. 1, extends from the powder flow leveling channel 18 through the housing 14 to release gases generated therein into the external ambient environment. It is preferable that gases be released and that powder not pass through the first vent 28 and for this purpose a porous filter 32 is preferably positioned within the first vent 28 to allow gases to pass therethrough in the direction shown by first vent air arrow 31 while preventing or at least minimizing the flow of powder outwardly therethrough. To further facilitate venting of such gases, a second vent 30 may be included through which gases can exit outwardly as shown by second vent gas arrow 33. This second vent is defined to be the very narrow space which naturally occurs between the secondary roller 42 and the housing. This second vent 30 provides a means for release of gases produced adjacent to the nip zone 26 as well as adjacent to the roller compacting zone 44. The unwanted movement of powder 10 outwardly through the second vent 30 is automatically achieved because this vent is self-cleaning due to the direction of rotation of secondary roller 42. As shown in FIG. 1 secondary roller 42 rotates in the clockwise direction which naturally causes the powder 10 to be continuous urged toward the roller compacting zone 44 thereby facilitating the release of gas in the direction shown by second vent gas arrow 33 while preventing any solids such as powder 10 from exiting therethrough.

An important optional aspect of the present invention is in the independent movement capable by the first dynamic side seal 54 as well as the second dynamic side seal 58 relative to the rollers 34 and 42 and relative to one another. During operation the compacting parameters will be continuously monitored by the sensing means 62. In those situations where the first sensing section 64 senses less compacting than the central sensing section 68 the speed of rotation of the first dynamic side seal 54 will be increased to enhance compacting thereadjacent. On the other hand, if the first sensing section 64 monitors a greater compaction than the central sensing section 68, the speed of rotation of the first dynamic side seal 54 will be decreased to compensate for that problem.

Similarly the compacting sensed by the second sensing section 66 will be monitored on a continual basis relative to the central sensing section 68. If the second sensing section 66 monitors compacting less than monitored by the central sensing section 68 the speed of rotation of the second dynamic side seal 58 can be increased to compensate therefore. Alternatively, in those unusual circumstances wherein the second sensing section 66 monitors compacting that is greater than monitored at the central sensing section 68, the speed of rotation of the second dynamic side seal 58 can be decreased to compensate therefore.

Furthermore the sensing means 62 of the present invention can also be used to increase the speed of driving of the rollers 34 and/or 42 or increase or decrease the speed of both the first dynamic side seal 54 and the second dynamic side seal 58 based upon other operational issues.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A powder compacting apparatus for continuous pressing of pharmaceutical powder into a compressed substrate comprising:

A. a main housing means adapted to receive powder for compacting thereof;

B. a primary roller means rotatably mounted adjacent said to said main housing means and being rotatably driven with respect thereto, said primary roller means including a primary circumferential compacting surface extending circumferentially therearound to facilitate compacting of powder moved thereadjacent, said primary roller means including an inner primary roller side means and an outer primary roller side means oppositely disposed therefrom;

C. a secondary roller means rotatably mounted adjacent said main housing means at a position immediately adjacent to said primary roller means and defining a roller compacting zone therebetween, said roller compacting zone being in flow communication with respect to said main housing means to receive powder therefrom for compacting thereof between said primary roller means and said secondary roller means, said secondary roller means including a secondary circumferential compacting surface extending circumferentially therearound to facilitate compacting of powder moved thereadjacent, said secondary roller means and said primary roller means being rotatably driven such that said primary circumferential compacting surface and said secondary circumferential compacting surface move together in the same direction adjacent said roller compacting zone to facilitate movement of powder therethrough for compacting thereof into a compressed substrate, said secondary roller means including an inner secondary roller side means and an outer secondary roller side means oppositely disposed therefrom;

D. a first dynamic side seal means positioned extending outwardly from adjacent said inner primary roller side means of said primary roller means adjacent to said roller compacting zone to facilitate defining thereof, said first dynamic side seal means extending further outwardly to a position adjacent said inner secondary roller side means of second secondary roller means to facilitate defining of said roller compaction zone thereadjacent and to prevent movement of powder outwardly laterally from said roller compacting zone past said inner primary roller side means and said inner secondary roller side means during compressing of powder moving through said roller compacting zone; and E. a second dynamic side seal means positioned extending outwardly from adjacent said outer primary roller side means of said primary roller means adjacent to said roller compacting zone to facilitate defining thereof, said second dynamic side seal means extending further outwardly to a position adjacent said outer secondary roller side means of said secondary roller means to facilitate defining of said roller compaction zone thereadjacent and to prevent movement of powder outwardly laterally from said roller compacting zone past said outer primary roller side means and said outer secondary roller side means during compressing of powder moving through said roller compaction zone, said first dynamic side seal means and said second dynamic side seal means are each independently driven to be selectively capable of rotational movement speeds different from one another and selectively different from the rotational speed of said primary roller means and said secondary roller means.

2. A powder compacting apparatus for continuous pressing of pharmaceutical powder into a compressed substrate as defined in claim 1 wherein said primary roller means and said secondary roller means are independently movable at selectively different rotational speeds.

3. A powder compacting apparatus for continuous pressing of pharmaceutical powder into a compressed substrate as defined in claim 1 wherein said first dynamic side seal means extends outwardly at least partially extending over said inner primary roller side means and at least partially over said inner secondary roller side means to facilitate retaining of powder within said roller compaction zone during compacting thereof and wherein said second dynamic side seal means extends outwardly at least partially extending over said outer primary roller side means and at least partially over said outer secondary roller side means to facilitate retaining of powder within said roller compaction zone during compacting thereof.

4. A powder compacting apparatus for continuous pressing of pharmaceutical powder into a compressed substrate as defined in claim 1 wherein said first dynamic side seal means comprises a first dynamic annular ring defining said roller compaction zone and at least partially extending over said inner primary roller side means and at least partially extending over said inner secondary roller side means for retaining powder within said roller compaction zone during compacting thereof and wherein said second dynamic side seal means comprises a second dynamic annular ring defining said roller compaction zone and at least partially extending over said outer primary roller side means and at least partially extending over said outer secondary roller side means for retaining powder within said roller compaction zone during compacting thereof.

5. A powder compacting apparatus for continuous pressing of pharmaceutical powder into a compressed substrate as defined in claim 1 wherein said first dynamic side seal means and said second dynamic side seal means are spatially disposed and parallel with respect to one another and extend perpendicularly with respect to said primary circumferential compacting surface and said secondary circumferential compacting surface to facilitate defining of said roller compaction zone therebetween.

6. A powder compacting apparatus for continuous pressing of pharmaceutical powder into a compressed substrate as defined in claim 1 wherein said main housing means includes:

(1) a powder inlet opening means for receiving powder therethrough; and (2) a powder flow leveling channel means in flow communication with respect to said powder inlet opening means for receiving powder therefrom for smoothing and leveling.

7. A powder compacting apparatus for continuous pressing of pharmaceutical powder into a compressed substrate as defined in claim 6 wherein said main housing means further comprises a powder introduction channel means in flow communication with respect to said powder inlet opening means for receiving powder therefrom and in flow communication with respect to said powder flow leveling channel means for supplying of powder thereto for compacting, said powder introduction channel being adapted to guide powder movement from said powder inlet opening means to said powder flow leveling channel means.

8. A powder compacting apparatus for continuous pressing of pharmaceutical powder into a compressed substrate as defined in claim 6 wherein said primary roller means, said first dynamic side seal means and said second dynamic side seal means are each rotatably mounted independently from one another with respect to said main housing means and are positioned with said primary circumferential compacting surface located within said powder flow leveling channel means to facilitate leveling of powder passing therethrough.

9. A powder compacting apparatus for continuous pressing of pharmaceutical powder into a compressed substrate as defined in claim 6 wherein said powder flow leveling channel means is tapered at least partially therealong to facilitate initial leveling of flow of powder passing therethrough.

10. A powder compacting apparatus for continuous pressing of pharmaceutical powder into a compressed substrate as defined in claim 8 wherein said main housing means includes an enhanced friction surface means defined within said powder flow leveling channel means to further facilitate flow leveling of powder passing therethrough.

11. A powder compacting apparatus for continuous pressing of pharmaceutical powder into a compressed substrate as defined in claim 8 wherein aid secondary roller means is rotatably mounted with respect to said main housing means and defines said roller compaction zone between said secondary circumferential compacting surface thereof and said primary circumferential compacting surface of said primary roller means and wherein said roller compacting zone is in flow communication with respect to said powder flow leveling channel means to receive powder therefrom.

12. A powder compacting apparatus for continuous pressing of pharmaceutical powder into a compressed substrate as defined in claim 11 wherein said main housing means defines a nip zone within said roller compacting zone wherein said first roller means and said secondary roller means initiate compacting of powder passing theretoward.

13. A powder compacting apparatus for continuous pressing of pharmaceutical powder into a compressed substrate as defined in claim 8 wherein said main housing means further defines a first vent means extending from said powder flow leveling channel means to the ambient environment to facilitate release of gases generated within said powder flow leveling channel means.

14. A powder compacting apparatus for continuous pressing of pharmaceutical powder into a compressed substrate as defined in claim 13 further comprising a porous filter means located within said first vent means to prevent powder from exiting said main housing while allowing gases to exit therefrom.

15. A powder compacting apparatus for continuous pressing of pharmaceutical powder into a compressed substrate as defined in claim 8 wherein said main housing means and said secondary roller means define therebetween a second vent means extending from said powder flow leveling channel means and said roller compaction zone to the ambient environment to facilitate release of gases generated.

16. A powder compacting apparatus for continuous pressing of pharmaceutical powder into a compressed substrate as defined in claim 15 wherein said secondary roller means rotates with respect to said main housing means in a direction toward said roller compaction zone to minimize exiting of powder outwardly from said main housing means through said second vent means while facilitating the exiting of gases therethrough.

17. A powder compacting apparatus for continuous pressing of pharmaceutical powder into a compressed substrate as defined in claim 1 further comprising a roller drive means for operatively driving of said primary roller means and said secondary rollers means.

18. A powder compacting apparatus for continuous pressing of pharmaceutical powder into a compressed substrate as defined in claim 17 wherein said roller drive means includes:

A. a primary roller drive operatively connected to said primary roller means for independently driving thereof; and B. a secondary roller drive operatively connected to said secondary roller means for independently driving thereof.

19. A powder compacting apparatus for continuous pressing of pharmaceutical powder into a compressed substrate as defined in claim 1 further comprising:

A. a first dynamic side seal drive means operatively connected to said first dynamic side seal means for independently driving thereof; and B. a second dynamic side seal drive means operatively connected to said second dynamic side seal means for independently driving thereof.

20. A powder compacting apparatus for continuous pressing of pharmaceutical powder into a compressed substrate as defined in claim 6 further comprising a sensing means mounted in said main housing means adjacent said powder flow leveling channel means for monitoring parameters of powder therewithin.

21. A powder compacting apparatus for continuous pressing of pharmaceutical powder into a compressed substrate as defined in claim 20 wherein said sensing means is operable to sense the pressure of compaction of powder within said housing.

22. A powder compacting apparatus for continuous pressing of pharmaceutical powder into a compressed substrate as defined in claim 20 wherein said sensing means is operable to sense the force during compaction of powder within said housing.

23. A powder compacting apparatus for continuous pressing of pharmaceutical powder into a compressed substrate as defined in claim 20 wherein said sensing means is operable to sense the shear stress during compaction of powder within said housing.

24. A powder compacting apparatus for continuous pressing of pharmaceutical powder into a compressed substrate as defined in claim 12 further comprising a sensing means mounted within said main housing means for monitoring the powder therewithin, said sensing means being positioned within said powder flow leveling channel means.

25. A powder compacting apparatus for continuous pressing of pharmaceutical powder into a compressed substrate as defined in claim 24 wherein said sensing means is positioned between said powder inlet opening means and said nip zone to enhance monitoring of powder thereadjacent.

26. A powder compacting apparatus for continuous pressing of pharmaceutical powder into a compressed substrate as defined in claim 25 wherein said sensing means is positioned within said main housing means adjacent to said powder flow leveling channel means at a location immediately adjacent said nip zone to facilitate monitoring of powder moving through said roller compaction zone.

27. A powder compacting apparatus for continuous pressing of pharmaceutical powder into a compressed substrate as defined in claim 20 wherein said sensing means comprises:

A. a first sensing section positioned adjacent said first dynamic side seal means for monitoring of powder passing thereadjacent;

B. a second sensing section positioned adjacent said second dynamic side seal means for monitoring of powder passing thereadjacent; and C. a central sensing section positioned spaced approximately equally from said first dynamic side seal means and said second dynamic side seal means for monitoring of powder passing centrally through said roller compaction zone.

28. A powder compacting apparatus for continuous pressing of pharmaceutical powder into a compressed substrate as defined in claim 27 wherein the speed of rotation of said first dynamic side seal means is operative to increase responsive to said first sensing section sensing less compaction of powder than sensed by said central sensing section.

29. A powder compacting apparatus for continuous pressing of pharmaceutical powder into a compressed substrate as defined in claim 27 wherein the speed of rotation of said second dynamic side seal means is operative to increase responsive to said second sensing section sensing less compaction of powder than sensed by said central sensing section.

30. A powder compacting apparatus for continuous pressing of pharmaceutical powder into a compressed substrate as defined in claim 27 wherein the speed of rotation of said first dynamic side seal means is operative to decrease responsive to said first sensing section sensing more compaction of powder than sensed by said central sensing section.

31. A powder compacting apparatus for continuous pressing of pharmaceutical powder into a compressed substrate as defined in claim 27 wherein the speed of rotation of said second dynamic side seal means is operative to decrease responsive to said second sensing section sensing more compaction of powder than sensed by said central sensing section.

32. A powder compacting apparatus for continuous pressing of pharmaceutical powder into a compressed substrate as defined in claim 27 wherein the speed of rotation of said first roller means and said secondary roller means is operative to be increased responsive to the said sensing means monitoring of powder compacting to a density less than a predetermined level.

33. A powder compacting apparatus for continuous pressing of pharmaceutical powder into a compressed substrate as defined in claim 27 wherein the speed of rotation of said first roller means and said secondary roller means is operative to be decreased responsive to the said sensing means monitoring of powder compacting to a density more than a predetermined level.

34. A powder compacting apparatus for continuous pressing of pharmaceutical powder into a compressed substrate comprising:

A. a main housing means adapted to receive powder for compacting thereof, said main housing means including:

(1) a powder inlet opening means for receiving powder therethrough for compacting thereof; and (2) a powder flow leveling channel means in flow communication with respect to said powder inlet opening means for receiving powder therefrom for compacting, said powder flow leveling channel means being tapered at least partially therealong to facilitate flow leveling of powder passing therethrough, said powder flow leveling channel means including an enhanced friction surface means therewithin to further facilitate flow leveling of powder therein;

(3) a powder introduction channel means in flow communication with respect to said powder inlet opening means for receiving powder therefrom and in flow communication with respect to said powder flow leveling channel means for supplying of powder thereto for flow leveling, said powder introduction channel being adapted to guide powder movement from said powder inlet opening means to said powder flow leveling channel means;

(4) a nip zone defined after said powder flow leveling channel means;

(5) a first vent means extending from said powder flow leveling channel means to the ambient environment to facilitate release of gases generated during powder compacting;

(6) a second vent means extending from said powder flow leveling channel means to the ambient environment to facilitate release of gases generated during powder compacting;

B. a primary roller means rotatably mounted adjacent said to said main housing means and being rotatably driven with respect thereto, said primary roller means including a primary circumferential compacting surface extending circumferentially therearound to facilitate compacting of powder moved thereadjacent, said primary roller means including an inner primary roller side means and an outer primary roller side means oppositely disposed therefrom.

C. a secondary roller means rotatably mounted adjacent said main housing means at a position immediately adjacent to said primary roller means and defining a roller compacting zone therebetween, said roller compacting zone being in flow communication with respect to said main housing means to receive powder therefrom for compacting thereof between said primary roller means and said secondary roller means, said secondary roller means including a secondary circumferential compacting surface extending circumferentially therearound to facilitate compacting of powder moved thereadjacent, said secondary roller means being rotatably driven along with said primary roller means such that said primary circumferential compacting surface and said secondary circumferential compacting surface move together simultaneously in the same direction adjacent said roller compaction zone to facilitate movement of powder therethrough for compacting thereof into a compressed substrate, said secondary roller means including an inner secondary roller side means and an outer secondary roller side means oppositely disposed therefrom, said secondary roller means being rotatably mounted with respect to said main housing means and defining said roller compaction zone between said secondary circumferential compacting surface thereof and said primary circumferential compacting surface of said primary roller means and wherein said roller compacting zone is in flow communication with respect to said powder flow leveling channel means to receive powder therefrom, said nip zone being defined within said roller compacting zone where said first roller means and said secondary roller means initiate compacting of powder passing theretoward, said main housing means and said secondary roller means defining therebetween said second vent means extending from said powder flow leveling channel means and said roller compaction zone to the ambient environment to facilitate release of gases generated during powder compacting;

D. a first dynamic side seal means positioned extending outwardly from adjacent said inner primary roller side means of said primary roller means adjacent to said roller compacting zone to facilitate defining thereof, said first dynamic side seal means extending further outwardly to a position adjacent said inner secondary roller side means of said secondary roller means to facilitate defining of said roller compaction zone thereadjacent and to prevent movement of powder outwardly laterally from said roller compacting zone past said inner primary roller side means and said inner secondary roller side means during compressing of powder moving through said roller compaction zone, said first dynamic side seal means being driven independently to be selectively capable of rotational movement speeds different from the rotational speed of said primary roller means and said secondary roller means, said first dynamic side seal means including a first dynamic annular ring defining said roller compaction zone thereadjacent, said primary roller means and said first dynamic side seal means an said second dynamic side seal means being each rotatably mounted independently from one another with respect to said main housing means and positioned with said primary circumferential compacting surface located within said powder flow leveling channel means to facilitate compacting of powder passing therethrough;

E. a second dynamic side seal means positioned extending outwardly from adjacent said outer primary roller side means of said primary roller means adjacent to said roller compacting zone to facilitate defining thereof, said second dynamic side seal means extending further outwardly to a position adjacent said outer secondary roller side means of said secondary roller means to facilitate defining of said roller compaction zone thereadjacent and to prevent movement of powder outwardly laterally from said roller compacting zone past said outer primary roller side means and said outer secondary roller side means during compressing of powder moving through said roller compaction zone, said second dynamic side seal means being driven independently to be selectively capable of rotational movement speeds different from the rotational speed of said primary roller means and of said secondary roller means and of said first dynamic side seal means, said first dynamic annular ring defining said roller compaction zone and at least partially extending over said inner primary roller side means and at least partially extending over said inner secondary roller side means for retaining powder within said roller compaction zone during compacting thereof, said second dynamic side seal means comprising a second dynamic annular ring defining said roller compaction zone thereadjacent and at least partially extending over said outer primary roller side means and at least partially extending over said outer secondary roller side means for retaining powder within said roller compaction zone during compacting thereof; and F. a sensing means mounted within said powder flow leveling channel means of said main housing means for monitoring the compacting of powder therewithin.

35. A powder compacting apparatus for continuous pressing of pharmaceutical powder into a compressed substrate comprising:

A. a main housing means adapted to receive powder for compacting thereof, said main housing means including:

(1) a powder inlet opening means for receiving powder therethrough for compacting thereof; and (2) a powder flow leveling channel means in flow communication with respect to said powder inlet opening means for receiving powder therefrom for compacting, said powder flow leveling channel means being tapered at least partially therealong to facilitate flow leveling of powder passing therethrough, said powder flow leveling channel means including an enhanced friction surface means therewithin to further facilitate compacting of powder therein;

(3) a powder introduction channel means in flow communication with respect to said powder inlet opening means for receiving powder therefrom and in flow communication with respect to said powder flow leveling channel means for supplying of powder thereto for compacting, said powder introduction channel being adapted to guide powder movement from said powder inlet opening means to said powder flow leveling channel means;

(4) a nip zone defined after said powder flow leveling channel means;

(5) a first vent means extending from said powder flow leveling channel means to the ambient environment to facilitate release of gases generated during powder compacting;

(6) a second vent means extending from said powder flow leveling channel means to the ambient environment to facilitate release of gases generated during powder compacting;

(7) a porous filter means located within said first vent means to prevent powder from exiting said main housing while allowing gases to exit therefrom;

B. a primary roller means rotatably mounted adjacent said to said main housing means and being rotatably driven with respect thereto, said primary roller means including a primary circumferential compacting surface extending circumferentially therearound to facilitate compacting of powder moved thereadjacent, said primary roller means including an inner primary roller side means and an outer primary roller side means oppositely disposed therefrom, said powder flow leveling channel means and said primary circumferential compacting surface of said primary roller means being adapted to exert shearing forces upon powder moving through said powder flow leveling channel means to facilitate flow leveling thereof;

C. a secondary roller means rotatably mounted adjacent said main housing means at a position immediately adjacent to said primary roller means and defining a roller compacting zone therebetween, said roller compacting zone being in flow communication with respect to said main housing means to receive powder therefrom for compacting thereof between said primary roller means and said secondary roller means, said secondary roller means including a secondary circumferential compacting surface extending circumferentially therearound to facilitate compacting of powder moved thereadjacent, said secondary roller means being rotatably driven along with said primary roller means such that said primary circumferential compacting surface and said second circumferential compacting surface move together simultaneously in the same direction adjacent said roller compaction zone to facilitate movement of powder therethrough for compacting thereof into a compressed substrate, said secondary roller means including an inner secondary roller side means and an outer secondary roller side means oppositely disposed therefrom, said secondary roller means being rotatably mounted with respect to said main housing means and defining said roller compaction zone between said secondary circumferential compacting surface thereof and said primary circumferential compacting surface of said primary roller means and wherein said roller compacting zone is in flow communication with respect to said powder flow leveling channel means to receive powder therefrom, said nip zone being defined after said powder flow leveling channel means within said roller compaction zone where said first roller means and said secondary roller means initiate compacting of powder passing theretoward, said main housing means and said secondary roller means defining therebetween said second vent means extending from said powder flow leveling channel means and said roller compaction zone to the ambient environment to facilitate release of gases generated during powder compacting, said secondary roller means adapted to rotate with respect to said main housing means in a direction toward said roller compaction zone to minimize exiting of powder outwardly from said main housing means through said second vent means while facilitating the exiting of gases therethrough;

D. a first dynamic side seal means positioned extending outwardly from adjacent said inner primary roller side means of said primary roller means adjacent to said roller compacting zone to facilitate defining thereof, said first dynamic side seal means extending further outwardly to a position adjacent said inner secondary roller side means of said secondary roller means to facilitate defining of said roller compaction zone thereadjacent and to prevent movement of powder outwardly laterally from said roller compacting zone past said inner primary roller side means and said inner secondary roller side means during compressing of powder moving through said roller compaction zone, said first dynamic side seal means being driven independently to be selectively capable of rotational movement speeds different from the rotational speed of said primary roller means and said second roller means, said first dynamic side seal means including a first dynamic annular ring defining said roller compaction zone thereadjacent, said primary roller means and said first dynamic side seal means and said second dynamic side seal means being each rotatably mounted independently from one another with respect to said main housing means and positioned with said primary circumferential compacting surface located within said powder flow leveling channel means to facilitate compacting of powder passing therethrough, said first dynamic side seal means extending perpendicularly with respect to said primary circumferential compacting surface and said secondary circumferential compacting surface to facilitate defining of said roller compaction zone therebetween;

E. a second dynamic side seal means positioned extending outwardly from adjacent said outer primary roller side means of said primary roller means adjacent to said roller compacting zone to facilitate defining thereof, said second dynamic side seal means extending further outwardly to a position adjacent said outer secondary roller side means of said secondary roller means to facilitate defining of said roller compaction zone thereadjacent and to prevent movement of powder outwardly laterally from said roller compacting zone past said outer primary roller side means and said outer secondary roller side means during compressing of powder moving though said roller compaction zone, said second dynamic side seal means being driven independently to be selectively capable of rotational movement speeds different from the rotational speed of said primary roller means and of said secondary roller means and of said first dynamic side seal means, said first dynamic annular ring defining said roller compaction zone and at least partially extending over said inner primary roller side means and at least partially extending over said inner secondary roller side means for retaining powder within said roller compaction zone during compacting thereof, said second dynamic side seal means comprising a second dynamic annular ring defining said roller compaction zone thereadjacent and at least partially extending over said outer primary roller side means and at least partially extending over said outer secondary roller side means for retaining powder within said roller compaction zone during compacting thereof, said first dynamic side seal means and said second dynamic side seal means being spatially disposed and parallel with respect to one another and extending perpendicularly with respect to said primary circumferential compacting surface and said secondary circumferential compacting surface to facilitate defining of said roller compaction zone therebetween;

F. a sensing means mounted within said powder flow leveling channel means of aid main housing means for monitoring the pressures during compacting of powder therewithin, said sensing means being positioned between said powder inlet opening means and said nip zone to enhance monitoring of powder compacting, said sensing means also being positioned within said powder flow leveling channel means at a location immediately adjacent said nip zone to facilitate monitoring of the pressures during compacting of powder moving through said roller compaction zone, said sensing means including;

(1) a first sensing section positioned adjacent said first dynamic side seal means for monitoring of powder passing thereadjacent;

(2) a second sensing section positioned adjacent said second dynamic side seal means for monitoring of powder passing thereadjacent;

(3) a central sensing section positioned spaced approximately equally from said first dynamic side seal means and said second dynamic side seal means for monitoring of powder passing centrally through said roller compaction zone, the speed of rotation of said first dynamic side seal means being operative to increase responsive to said first sensing section sensing less pressure during flow leveling of powder than sensed by said central sensing section, the speed of rotation of said second dynamic side seal means being operative to increase responsive to said second sensing section sensing less pressure during flow leveling of powder than sensed by said central sensing section, and the speed of rotation of said first dynamic side seal means being operative to decrease responsive to said first sensing section sensing more pressure during flow leveling of powder than sensed by said central sensing section, the speed of rotation of said second dynamic side seal means being operative to decrease responsive to said second sensing section sensing more pressure during flow leveling of powder than sensed by said central sensing section;

G. a roller drive means for operatively driving of said primary roller means and said secondary rollers means;

H. a first dynamic side seal drive means operatively connected to said first dynamic side seal means for independently driving thereof; and I. a second dynamic side seal drive means operatively connected to said second dynamic side seal means for independently driving thereof.

36. A powder compacting apparatus for continuous pressing of pharmaceutical powder into a compressed substrate comprising:

A. a main housing means adapted to receive powder for compacting thereof which includes:

(1) a powder inlet opening means for receiving powder therethrough for compacting thereof; and (2) a powder flow leveling channel means in flow communication with respect to said powder inlet opening means for receiving powder therefrom for flow leveling thereof;

B. a primary roller means rotatably mounted adjacent said to said man housing means and being rotatably driven with respect thereto, said primary roller means including a primary circumferential compacting surface extending circumferentially therearound to facilitate compacting of powder moved thereadjacent, said primary roller means including an inner primary roller side means and an outer primary roller side means oppositely disposed therefrom, said primary circumferential compacting surface and said main housing means defining said powder flow leveling channel means therebetween;

C. a secondary roller means rotatably mounted adjacent said man housing means at a position immediately adjacent to said primary roller means and defining a roller compacting zone therebetween, said roller compacting zone being in flow communication with respect to said powder flow leveling channel means to receive powder therefrom for compacting thereof between said primary roller means and said secondary roller means, said secondary roller means including a secondary circumferential compacting surface extending circumferentially therearound to facilitate compacting of powder moved thereadjacent, said secondary roller means being rotatably and said primary roller means being rotatably driven such that said primary circumferential compacting surface and said secondary circumferential compacting surface move together in the same direction adjacent said roller compaction zone to facilitate movement of powder therethrough for compacting thereof into a compressed substrate, said secondary roller means including an inner secondary roller side means and an outer secondary roller side means oppositely disposed therefrom;

D. a first side seal means positioned extending outwardly from adjacent said inner primary roller side means of said primary roller means adjacent to said roller compacting zone to facilitate defining thereof, said first side seal means extending further outwardly to a position adjacent said inner secondary roller side means of said secondary roller means to facilitate defining of said roller compaction zone thereadjacent and to prevent movement of powder outwardly laterally from said roller compacting zone past said inner primary roller side means and said inner secondary roller side means during compressing of powder moving through said roller compaction zone;

E. a second side seal means positioned extending outwardly from adjacent said outer primary roller side means of said primary roller means adjacent to said roller compacting zone to facilitate defining thereof, said second side seal means extending further outwardly to a position adjacent said outer secondary roller side means of said secondary roller means to facilitate defining of said roller compaction zone thereadjacent and to prevent movement of powder outwardly laterally from said roller compacting zone past said outer primary roller side means and said outer secondary roller side means during compressing of powder moving though said roller compaction zone; and F. a sensing means mounted in said main housing means adjacent said powder flow leveling channel means for monitoring the condition of powder therewithin.

37. A powder compacting apparatus for continuous pressing of pharmaceutical powder into a compressed substrate as defined in claim 36 wherein said powder flow leveling channel means is tapered at least partially therealong to facilitate flow leveling of powder passing therethrough.

38. A powder compacting apparatus for continuous pressing of pharmaceutical powder into a compressed substrate as defined in claim 36 wherein said main housing means includes an enhanced friction surface means defined within and along said powder flow leveling channel means to further facilitate flow leveling of powder passing therethrough.

39. A powder compacting apparatus for continuous pressing of pharmaceutical powder into a compressed substrate as defined in claim 36 wherein said main housing means defines a nip zone after said powder flow leveling channel means within said roller compaction zone.

40. A powder compacting apparatus for continuous pressing of pharmaceutical powder into a compressed substrate as defined in claim 36 wherein said main housing means further defines a first vent means extending from said powder flow leveling channel means to the ambient environment to facilitate release of gases generated therewithin.

41. A powder compacting apparatus for continuous pressing of pharmaceutical powder into a compressed substrate as defined in claim 40 further comprising a porous filter means located within said first vent means to prevent powder from exiting said main housing while allowing gases to exit therefrom.

42. A powder compacting apparatus for continuous pressing of pharmaceutical powder into a compressed substrate as defined in claim 36 wherein said main housing means and said secondary roller means define therebetween a second vent means extending from said powder flow leveling channel means and said roller compaction zone to the ambient environment to facilitate release of gases generated therewithin.

43. A powder compacting apparatus for continuous pressing of pharmaceutical powder into a compressed substrate as defined in claim 42 wherein said secondary roller means rotates with respect to said main housing means in a direction toward said roller compaction zone to minimize exiting of powder outwardly from said main housing means through said second vent means while facilitating the exiting of gases therethrough.

44. A powder compacting apparatus for continuous pressing of pharmaceutical powder into a compressed substrate as defined in claim 39 wherein said sensing means is positioned within said main housing means adjacent said powder flow leveling channel means to facilitate monitoring of smoothing of powder moving toward said roller compaction zone.

45. A powder compacting apparatus for continuous pressing of pharmaceutical powder into a compressed substrate as defined in claim 36 wherein said sensing means comprises:

A. a first sensing section positioned adjacent said first side seal means for monitoring of powder passing thereadjacent;

B. a second sensing section positioned adjacent said second side seal means for monitoring of powder passing thereadjacent; and C. a central sensing section positioned spaced approximately equally from said first side seal means and said second side seal means for monitoring of powder passing centrally through said roller compaction zone.

* * * * *